United States Patent
Mannsperger et al.

(10) Patent No.: US 11,987,231 B2
(45) Date of Patent: May 21, 2024

(54) METHOD FOR ASCERTAINING A CHARACTERISTIC VARIABLE OF A CLUTCH DURING GENERATOR OPERATION

(71) Applicant: Schaeffler Technologies AG & Co. KG, Herzogenaurach (DE)

(72) Inventors: Ralf Mannsperger, Renchen (DE); Timo Enders, Bensheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 302 days.

(21) Appl. No.: 17/292,752

(22) PCT Filed: Oct. 17, 2019

(86) PCT No.: PCT/DE2019/100906
§ 371 (c)(1),
(2) Date: May 11, 2021

(87) PCT Pub. No.: WO2020/103973
PCT Pub. Date: May 28, 2020

(65) Prior Publication Data
US 2021/0394742 A1    Dec. 23, 2021

(30) Foreign Application Priority Data
Nov. 19, 2018 (DE) .......................... 102018128961.8

(51) Int. Cl.
*B60W 20/40* (2016.01)
*B60K 6/387* (2007.10)
(Continued)

(52) U.S. Cl.
CPC ............. *B60W 20/40* (2013.01); *B60K 6/387* (2013.01); *B60K 6/48* (2013.01); *B60W 10/02* (2013.01);
(Continued)

(58) Field of Classification Search
CPC ...... B60W 20/40; B60W 10/02; B60W 10/06; B60W 10/08; B60W 2710/025;
(Continued)

(56) References Cited

U.S. PATENT DOCUMENTS 6,085,723 A    7/2000 Pels et al.
8,494,739 B2 *  7/2013 Falkenstein ........... B60W 10/02
                                                    701/67
(Continued)

FOREIGN PATENT DOCUMENTS

CN    200984966 Y    12/2007
CN    105473406 A     4/2016
(Continued)

OTHER PUBLICATIONS

JP-6805635-B2_English Translation (Year: 2020).*

*Primary Examiner* — Rachid Bendidi
*Assistant Examiner* — Dana F Artimez

(57) ABSTRACT

A method ascertains a characteristic variable of a clutch installed in a drive train of a vehicle for transmitting a transmission torque between a clutch input and a clutch output. A first electric motor is connected to the clutch input and to an internal combustion engine and can assume generator operation, during which it is driven by the internal combustion engine. A second electric motor is connected to the clutch output. The clutch input can have a first rotational speed and the clutch output can have a second rotational speed. The transmission torque during generator operation is ascertained by activating the clutch to adopt a slipping state and in doing so by setting a predefined rotational speed difference between the first and second rotational speed. The clutch input torque present at the clutch input is then ascertained and the transmission torque is determined depending on the clutch input torque.

16 Claims, 2 Drawing Sheets

(51) Int. Cl.
  *B60K 6/48* (2007.10)
  *B60W 10/02* (2006.01)
  *B60W 10/06* (2006.01)
  *B60W 10/08* (2006.01)
(52) U.S. Cl.
  CPC ............ *B60W 10/06* (2013.01); *B60W 10/08* (2013.01); *B60W 2710/025* (2013.01); *B60W 2710/027* (2013.01); *B60W 2710/083* (2013.01)
(58) Field of Classification Search
  CPC ...... B60W 2710/027; B60W 2710/083; B60K 6/387; B60K 6/48; F16D 2500/1066; F16D 2500/30412; F16D 2500/30415; F16D 2500/30426; F16D 2500/3111; F16D 2500/50236; F16D 2500/7044; F16D 48/06; Y02T 10/62
  See application file for complete search history.

(56) References Cited

U.S. PATENT DOCUMENTS

| | | | |
|---|---|---|---|
| 2007/0246273 A1 | 10/2007 | Tenbrock et al. | |
| 2007/0246275 A1 | 10/2007 | Dreibholz et al. | |
| 2009/0011899 A1* | 1/2009 | Reuschel | B60K 6/387 903/946 |
| 2009/0194381 A1 | 8/2009 | Samie et al. | |
| 2010/0151990 A1 | 6/2010 | Seel | |
| 2011/0093146 A1* | 4/2011 | Falkenstein | B60W 10/08 903/902 |
| 2011/0237389 A1* | 9/2011 | Ohashi | F16H 61/143 477/76 |
| 2014/0148309 A1* | 5/2014 | Yamazaki | B60W 30/19 477/109 |
| 2015/0073673 A1 | 3/2015 | Hata et al. | |
| 2015/0149058 A1* | 5/2015 | Kim | F16D 48/06 701/93 |
| 2016/0159343 A1* | 6/2016 | Hata | B60W 10/02 180/65.265 |
| 2017/0036666 A1* | 2/2017 | Severinsky | B60L 50/16 |
| 2017/0342920 A1 | 11/2017 | Pirjaberi et al. | |

FOREIGN PATENT DOCUMENTS

| | | |
|---|---|---|
| CN | 106274891 A | 1/2017 |
| CN | 106662176 A | 5/2017 |
| CN | 108454380 A | 8/2018 |
| CN | 112673189 A | 4/2021 |
| DE | 10246839 A1 | 4/2004 |
| DE | 102006016133 A1 | 10/2007 |
| DE | 102006034937 A1 | 1/2008 |
| DE | 102008027071 A1 | 1/2009 |
| DE | 102008001144 | 10/2009 |
| DE | 102009059944 A1 | 7/2010 |
| DE | 102009022240 | 2/2011 |
| DE | 102012204929 A1 | 10/2012 |
| DE | 102012102276 | 9/2013 |
| DE | 102013206193 A1 | 10/2013 |
| DE | 102013222607 | 9/2014 |
| DE | 102015218691 A1 | 4/2016 |
| DE | 102015224810 | 7/2016 |
| DE | 102015216071 A1 | 3/2017 |
| DE | 102015216166 | 3/2017 |
| DE | 102016125003 A1 | 6/2018 |
| DE | 102018107979 A1 | 8/2019 |
| EP | 0338485 A2 | 10/1989 |
| EP | 1681496 A2 | 7/2006 |
| EP | 2055556 A2 | 5/2009 |
| GB | 2508665 A | 6/2014 |
| JP | 2007196908 A | 8/2007 |
| JP | 2018030507 A | 3/2018 |
| JP | 6805635 B2 * | 12/2020 |
| KR | 20010085791 A | 9/2001 |
| KR | 101583102 B1 | 1/2016 |
| WO | 2016008463 | 1/2016 |

* cited by examiner

METHOD FOR ASCERTAINING A CHARACTERISTIC VARIABLE OF A CLUTCH DURING GENERATOR OPERATION

CROSS-REFERENCE TO RELATED APPLICATIONS

This application is the U.S. National Phase of PCT Appln. No. PCT/DE2019/100906 filed Oct. 17, 2019, which claims priority to DE 102018128961.8 filed Nov. 19, 2018, the entire disclosures of which are incorporated by reference herein.

TECHNICAL FIELD

The disclosure relates to a method for ascertaining a characteristic variable of a clutch installed in a drive train of a vehicle.

BACKGROUND

For automatically actuated clutches, knowledge of the characteristic variable of the clutch on which the actuation of the clutch depends is of crucial importance for achieving good driving comfort and for ensuring the operational safety of the clutch and the vehicle. The automated or partially automated actuation of the clutch is usually carried out by a clutch actuator in which an actuating unit is displaced along a travel path and thereby actuates the clutch. The transmitted transmission torque of the clutch depends on the position of the actuating unit and on the coefficient of friction of the friction lining(s) of the clutch. This relationship between the transmission torque and the travel path can be described by a clutch characteristic that is stored in a clutch control of the clutch.

The transmission torque-defining properties of the clutch can change during the operation of the vehicle, for example due to temperature fluctuations, wear or fatigue processes in the components. For reliable operation of the clutch, however, knowledge of the characteristic variable of the clutch is of great importance. While the travel path can be evaluated and readjusted via a sensor system, the coefficient of friction of the friction linings, and thus the transmission torque, is more difficult to ascertain.

In WO 2016/008463, a method for adapting a coefficient of friction of a hybrid disconnect clutch is proposed. The hybrid disconnect clutch connects an internal combustion engine to an electric motor. When the internal combustion engine is running, the clutch is first opened and then closed far enough for the clutch to be operated in a slipping manner. The output rotational speed on the drive train remains constant here. The adaptation of the coefficient of friction then takes place depending on the position of the actuating unit from which the clutch is operated in a slipping manner.

SUMMARY

It is desirable to improve a method for ascertaining a characteristic variable of a clutch installed in a drive train of a vehicle. In particular, this should be ascertained at shorter time intervals.

A method for ascertaining a characteristic variable of a clutch installed in a drive train of a vehicle for transmitting a transmission torque between a clutch input and a clutch output is proposed. A first electric motor is connected to the clutch input and to an internal combustion engine and can assume generator operation, during which it is driven by the internal combustion engine. A second electric motor is connected to the clutch output. The clutch input can have a first rotational speed and the clutch output can have a second rotational speed. The transmission torque during generator operation is ascertained by activating the clutch to adopt a slipping state and in doing so by setting a predefined rotational speed difference between the first and second rotational speed. The clutch input torque present at the clutch input is then ascertained and the transmission torque is determined depending on the clutch input torque.

As a result, the characteristic variable of the clutch, which depends on the transmission torque, can be ascertained at smaller time intervals. Furthermore, the effect on the vehicle resulting from the implementation of the method can be so small that this method can be performed unnoticed from the outside and by vehicle users. The reliability of the clutch can be increased and the operational safety and driving comfort of the vehicle can be improved.

The first electric motor can produce a first drive torque. The first electric motor can provide a first drive torque to the clutch input. A rotor of the first electric motor can be connected to an output of the internal combustion engine.

The second electric motor can produce a second drive torque. The second electric motor can deliver the second drive torque to a vehicle wheel.

The internal combustion engine can produce a third drive torque. The clutch input torque can mainly be formed by the third drive torque. The first and third drive torque can be applied jointly to the clutch input.

During generator operation, the first electric motor causes a first counter-torque compared to the third drive torque, wherein the transmission torque is ascertained to be equal to the torque difference between the third drive torque and the first counter-torque.

The second electric motor may regulate the second rotational speed.

The internal combustion engine may regulate the first rotational speed.

During generator mode, the internal combustion engine can be operated at a constant rotational speed. The first rotational speed is preferably approximately constant during generator operation. The first rotational speed during generator operation can be an optimal rotational speed of the internal combustion engine at which the internal combustion engine has the highest efficiency.

The rotational speed difference can also be set by the first electric motor regulating the first rotational speed.

The clutch may be opened during generator operation and actuated to ascertain the transmission torque. During generator operation, the first and second electric motors can act in a series hybrid arrangement. The first electric motor can be driven by the internal combustion engine and generate electrical energy that the second electric motor can convert into drive energy. As an alternative or in addition, the generated electrical energy can be supplied to an electrical energy store, for example a rechargeable battery.

The second rotational speed may be less than or greater than the first rotational speed.

The first and second rotational speeds may be approximately constant when the transmission torque is ascertained.

Ascertainment of the transmission torque may be triggered when the rotational speed difference between the first and second rotational speed falls below a threshold value. As a result, the second rotational speed to be specified by the second electric motor for performing the method can be adjusted more imperceptibly.

The clutch may be a KO clutch such that when the clutch is opened, the second electric motor can move mechanically independently of the first electric motor and the internal combustion engine.

The transmission torque and the rotational speed difference from the second and first rotational speed may be used to define a coefficient of friction. The characteristic variable of the clutch stored in a clutch control of the clutch, for example the coefficient of friction, can be adapted depending on the characteristic variable of the clutch ascertained.

BRIEF DESCRIPTION OF THE DRAWINGS

Further advantages and advantageous embodiments result from the description of the figures and the drawings.

The method is described in detail below with reference to the drawings. Specifically.

DETAILED DESCRIPTION

Figure 1:
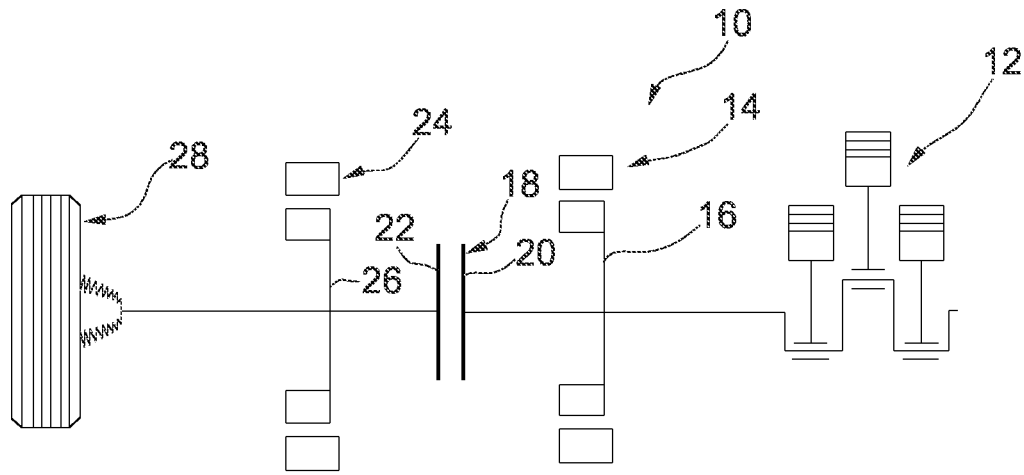
FIG. 1: shows a drive train of a vehicle with a clutch, the characteristic variable of which is ascertained according to a method.

FIG. 1 shows a drive train 10 of a vehicle with a clutch 18, the transmission torque of which is ascertained according to a method. The drive train comprises an internal combustion engine 12 that is connected to a first electric motor 14. An output of the internal combustion engine 12 is thus non-rotatably connected to a rotor 16 of the first electric motor 14.

The first electric motor 14 is connected to a clutch 18. The rotor 16 is non-rotatably connected to a clutch input 20 of the clutch 18. A clutch output 22 of the clutch 18 can be brought into operative engagement by friction with the clutch input 20 when the clutch 18 is actuated. If the clutch 18 is closed, a torque can be transmitted between clutch input 20 and clutch output 22. The torque transmitted by the clutch 18 at a specific point in time represents the transmission torque.

The clutch output 22 is connected to a second electric motor 24. A rotor 26 of the second electric motor 24 is non-rotatably connected to the clutch output 22. The rotor 26 is also connected to a vehicle wheel 28.

The first electric motor 14 can produce a first drive torque, the second electric motor 24 can produce a second drive torque, and the internal combustion engine 12 can produce a third drive torque. The first and third drive torque can be applied to the clutch input 20. The second drive torque can be applied to the clutch output 22 and to the vehicle wheel 28.

The clutch 18 is a disconnect clutch, in particular a KO clutch. When the clutch 18 is opened, the second electric motor 24 can move mechanically independently of the first electric motor 14 and the internal combustion engine 12. The second electric motor 24 alone can provide the second drive torque to the vehicle wheel 28. The vehicle can be moved by the second drive torque.

The first electric motor 14 can be in a generator operation, in particular when the clutch 18 is open, in which the first electric motor 14 produces a first counter-torque with respect to the third drive torque. During generator operation, the first electric motor 14 and the second electric motor 24 act in a series hybrid arrangement. The first electric motor 14 is driven by the internal combustion engine 12 and thus generates electrical energy which the second electric motor 24 can convert into drive energy as a second drive torque.

The torque present at clutch input 20 during generator operation as a clutch input torque is mainly formed by the third drive torque. In particular, the clutch input torque corresponds to the torque difference between the third drive torque and the counter-torque of the first electric motor 14 running during generator operation.

Figure 2:
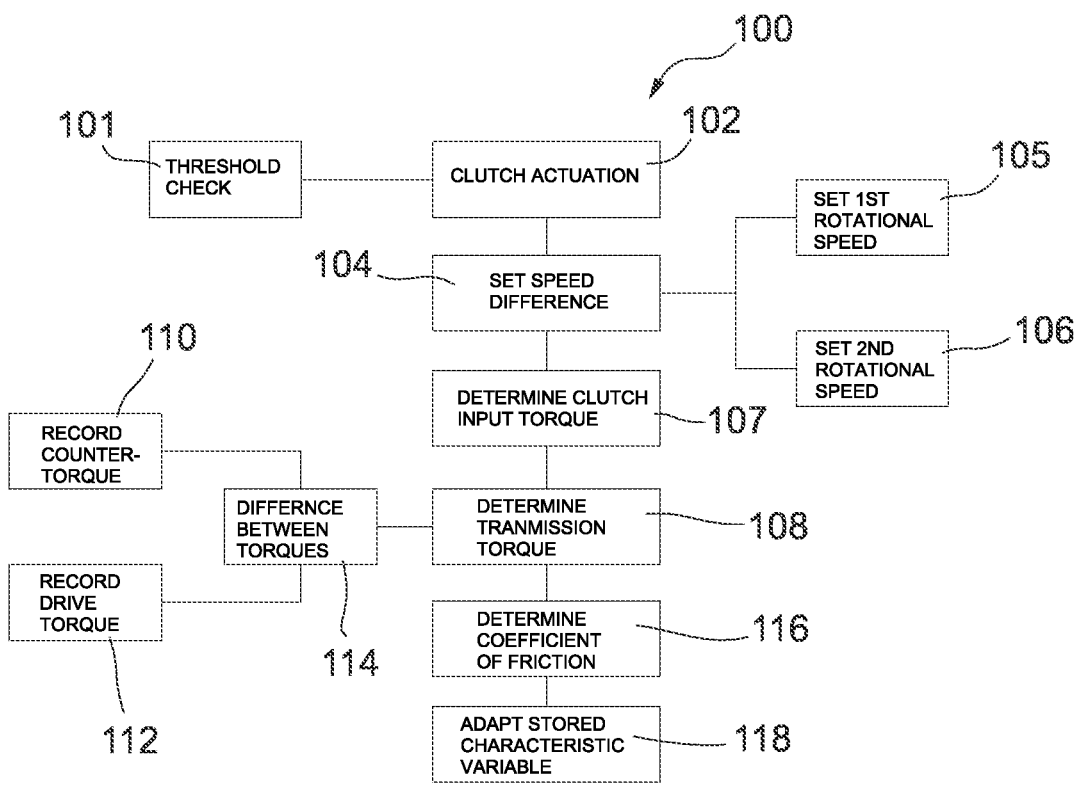
FIG. 2: shows a method for ascertaining a characteristic variable of the clutch.

FIG. 2 shows a method 100 for ascertaining a characteristic variable of the clutch. The method 100 ascertains a characteristic variable of a clutch installed in a drive train of a vehicle. The clutch enables a transmission torque to be transmitted between a clutch input and a clutch output. A first electric motor is connected to the clutch input and to an internal combustion engine. The first electric motor can assume generator operation, in which the first electric motor is driven by an internal combustion engine. During generator operation, the internal combustion engine is preferably operated at a constant rotational speed, which forms the first rotational speed. The first rotational speed during generator operation can be an optimal rotational speed of the internal combustion engine at which the internal combustion engine has the highest efficiency.

A second electric motor is connected to the clutch output. The second electric motor changes the second rotational speed, for example, depending on the load requirement of the vehicle. The second rotational speed is thus applied to the clutch output of the opened clutch depending on an operating state of the vehicle.

The transmission torque is ascertained when a threshold value check 101 of the rotational speed difference between the first and second rotational speed shows that the rotational speed difference falls below a threshold value. If said ascertaining is triggered, the clutch is actuated to ascertain the transmission torque. The transmission torque during generator operation of the first electric motor is ascertained by actuating the clutch by a clutch actuation 102 in order to adopt a slipping state. A predetermined rotational speed difference 104 is set between the first and second rotational speed. The second rotational speed can be less than or greater than the first rotational speed. The rotational speed difference can be, for example, 100 rpm.

The rotational speed difference is set by the internal combustion engine continuing to provide 105 the constant first rotational speed present during generator operation at the clutch input and the second electric motor specifying 106, in particular regulating, the second rotational speed. The first and second rotational speeds are approximately constant when ascertaining the transmission torque.

This is followed by a determination 107 of the clutch input torque present at the clutch input and an ascertaining 108 of the transmission torque depending on the clutch input torque. For this purpose, the first counter-torque caused by the first electric motor during generator operation is recorded 110 and the third drive torque of the internal combustion engine is also recorded 112. The transmission torque is then ascertained 114 to be equal to the torque difference between the third drive torque and the first counter-torque.

The transmission torque and the rotational speed difference from the second and first rotational speed are used to define 116 a coefficient of friction of the clutch. An adaptation 118 of the characteristic variable of the clutch stored in a clutch control of the clutch can then take place depending on the ascertained coefficient of friction.

Figure 3:
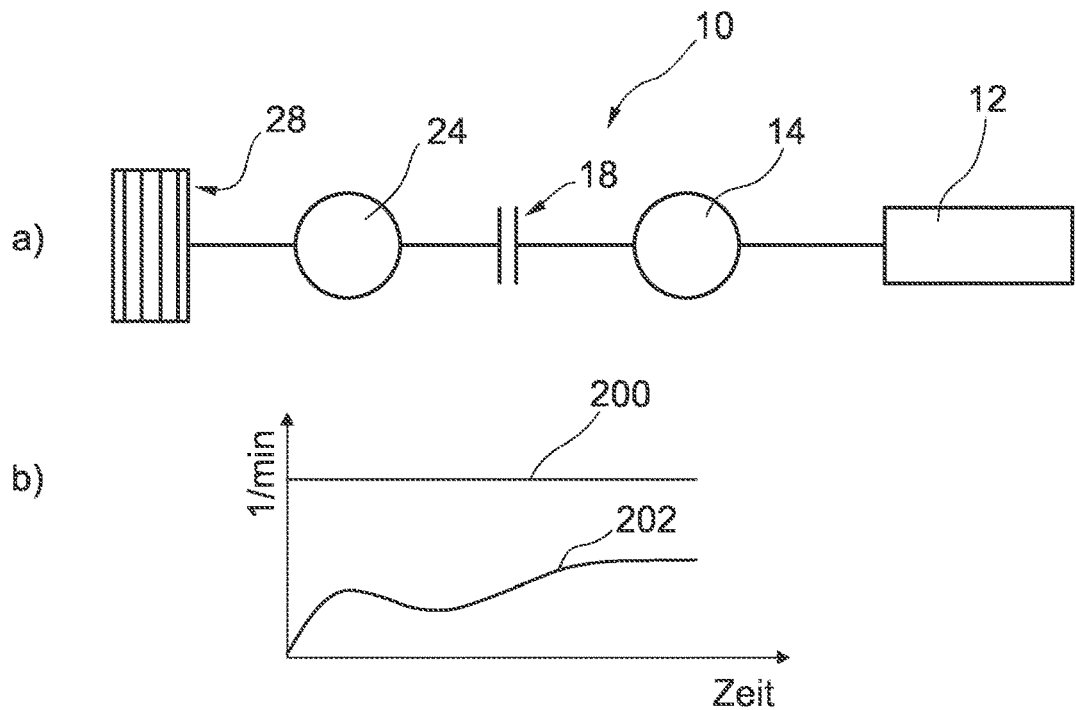
FIG. 3a: shows a drive train of a vehicle with a clutch in a first operating state, the characteristic variable of which clutch is ascertained according to a method.
FIG. 3b: shows a time curve of the first and second rotational speed in the first operating state of the clutch, the characteristic variable of which is ascertained according to a method.

FIG. 3a shows a drive train 10 of a vehicle with a clutch 18 in a first operating state, the characteristic variable of which clutch is ascertained according to a method. The drive train 10 comprises an internal combustion engine 12 that is connected to a first electric motor 14 and, together with the first electric motor 14, to a clutch 18.

A second electric motor 24 is downstream of the clutch 18, which second electric motor is connected to a vehicle wheel. In the first operating state, the clutch is open.

FIG. 3b shows a time curve of the first and second rotational speed in the first operating state of the clutch. The first electric motor is in generator operation, in which the internal combustion engine influences the first rotational speed 200 and ideally keeps it constant.

The second rotational speed 202 brought about by the second electric motor changes over time depending on the load requirement of the vehicle and is, in this example, lower than the first rotational speed 200.

Figure 4:
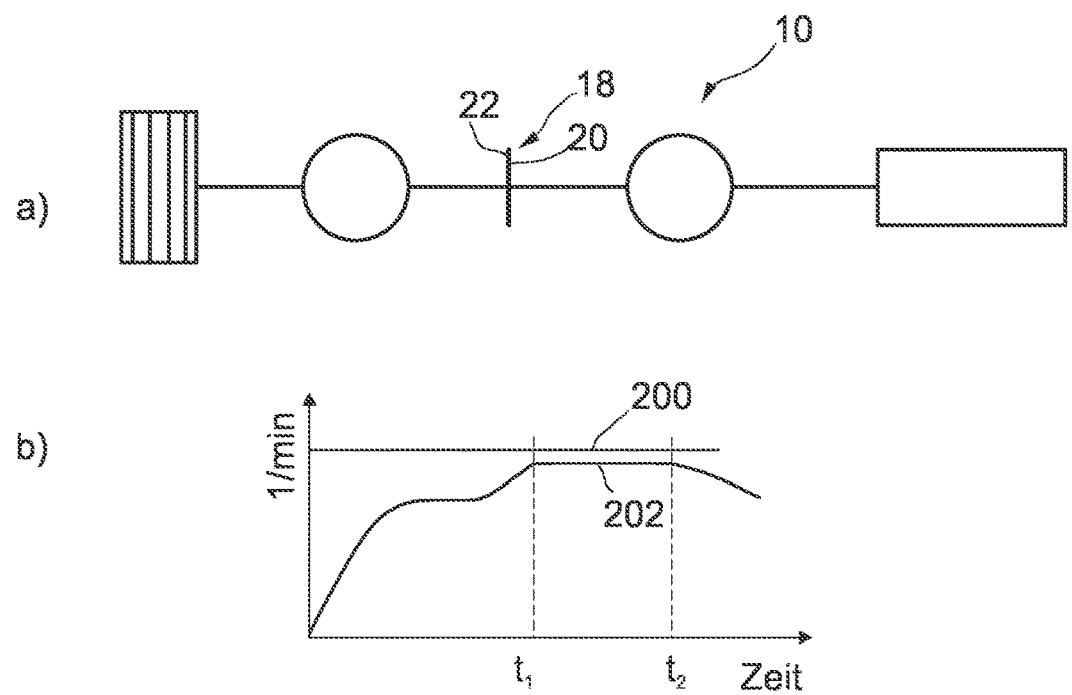
FIG. 4a: shows a drive train of a vehicle with a clutch in a second operating state, in which a method is carried out.
FIG. 4b: shows a time curve of the first and second rotational speed in the second operating state of the clutch, the characteristic variable of which is ascertained according to a method.

FIG. 4a shows a drive train 10 of a vehicle with a clutch 18 in a second operating state, the characteristic variable of which clutch is ascertained according to a method. The clutch 18 is in a slipping state in which the clutch input 20 has a first rotational speed and the clutch output 22 has a second rotational speed.

FIG. 4b shows a time curve of the first and second rotational speed in the second operating state of the clutch. The first electric motor is in generator operation. If the threshold value check of the rotational speed difference between the first and second rotational speed shows that the rotational speed difference falls below a threshold value, which occurs at time $t_1$, then the ascertaining of the characteristic variable is initiated and the clutch is brought into the second operating state.

For this purpose, the clutch is actuated and switched to slipping operation, in which the second electric motor sets a constant second rotational speed 202. The first rotational speed 200 is set to be constant by the internal combustion engine driving the first electric motor during generator operation. The rotational speed difference is thus kept constant from time $t_1$ in order to be able to ascertain the transmission torque.

Once the ascertaining of what takes place at time $t_2$ has been completed, the clutch is opened again and the clutch returns to the first operating state. When carrying out the ascertaining, the driver's request always has priority. If the driver of the vehicle wants to change the driving rotational speed and the second rotational speed would also have to change for this, the ascertaining is aborted and carried out at a different, more favorable point in time.

LIST OF REFERENCE SYMBOLS

10 Drive train
12 Internal combustion engine
14 First electric motor
16 Rotor
18 Clutch
20 Clutch input
22 Clutch output
24 Second electric motor
26 Rotor
28 Vehicle wheel
100 Method
101 Threshold value check
102 Clutch actuation
104 Setting of the rotational speed difference
105 Provision of the first rotational speed
106 Specification of the second rotational speed
107 Ascertaining of the clutch input torque
108 Recording of the transmission torque
110 Recording of the counter-torque
112 Recording of the third drive torque
114 Ascertaining of the transmission torque
116 Definition of a coefficient of friction
118 Adaptation of the characteristic variable of the clutch
200 First rotational speed
202 Second rotational speed

The invention claimed is:

1. A method for ascertaining a characteristic variable of a clutch installed in a drive train of a vehicle for transmitting a transmission torque between a clutch input and a clutch output, wherein the drive train of the vehicle comprising:
   a first electric motor is connected to the clutch input and to an internal combustion engine and may assume a generator operation when it is driven by the internal combustion engine,
   a second electric motor is connected to the clutch output; the clutch input having a first rotational speed and the clutch output having a second rotational speed,
   wherein, in response to ascertaining that a speed difference between the first rotational speed and the second rotational speed is less than a threshold value, the transmission torque during the generator operation is ascertained by activating the clutch to adopt a slipping state and setting a predefined rotational speed difference between the first and second rotational speed,
   wherein, during the generator operation, the first electric motor causes a counter-torque opposing a drive torque from the internal combustion engine, wherein the transmission torque is ascertained to be equal to a torque difference between the drive torque and the counter-torque.

2. The method according to claim 1, wherein the predefined rotational speed difference is set by the second electric motor regulating the second rotational speed.

3. The method according to claim 1, wherein the predefined rotational speed difference is set by the internal combustion engine regulating the first rotational speed.

4. The method according to claim 1, wherein the clutch is opened during the generator operation and is actuated to ascertain the transmission torque.

5. The method according to claim 1, wherein the second rotational speed is less than the first rotational speed.

6. The method according to claim 1, wherein the first and second rotational speeds are approximately constant when ascertaining the transmission torque.

7. The method according to claim 1, wherein the clutch is a disconnect clutch.

8. The method according to claim 1, wherein the transmission torque and the predefined rotational speed difference between the second and first rotational speeds are used to calculate the characteristic variable.

9. The method according to claim 1, wherein the characteristic variable is a coefficient of friction.

10. A method for ascertaining a characteristic variable of a clutch, the clutch comprising:
- an input rotationally connected to a rotor of first electric motor and to an internal combustion engine and having a first rotational speed; and
- an output rotationally connected to a rotor of a second electric motor which is driveably connected to vehicle wheels and having a second rotational speed;
- the method comprising:
- operating in a generator mode wherein the clutch is open and the first electric machine motor produces a counter-torque to resist a torque produced by the internal combustion engine; and
- in response to determining a speed difference between the first rotational speed and the second rotational speed is less than a threshold value:
- activating the clutch to adopt a slipping state;
- maintaining the speed difference at a predetermined value; and calculating the characteristic variable based on a difference between the torque produced by the internal combustion engine and the counter-torque produced by the first electric motor.

11. The method according to claim 10, wherein maintaining the speed difference comprises using the second electric motor to regulate the second rotational speed.

12. The method according to claim 10, wherein maintaining the speed difference comprises using the internal combustion engine to regulate the first rotational speed.

13. The method according to claim 10, wherein the second rotational speed is less than the first rotational speed while maintaining the speed difference at the predetermined value.

14. The method according to claim 10, wherein maintaining the speed difference comprises maintaining the first and second rotational speeds constant.

15. The method according to claim 10, wherein the characteristic variable is a coefficient of friction.

16. The method according to claim 10, further comprising abandoning the procedure in response to a driver demand before calculating the characteristic variable.

* * * * *